Aug. 29, 1933.  R. A. FONTAINE  1,924,235
TRUCK AND TRAILER COUPLING MECHANISM
Filed July 28, 1930
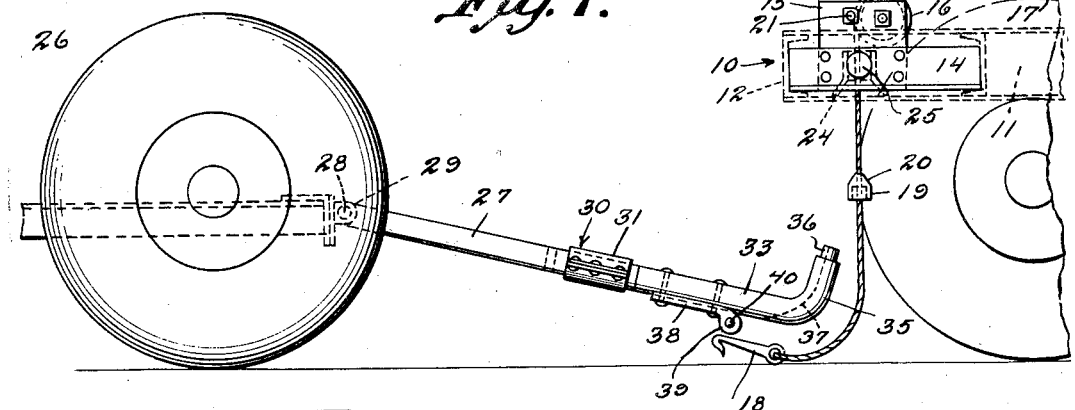
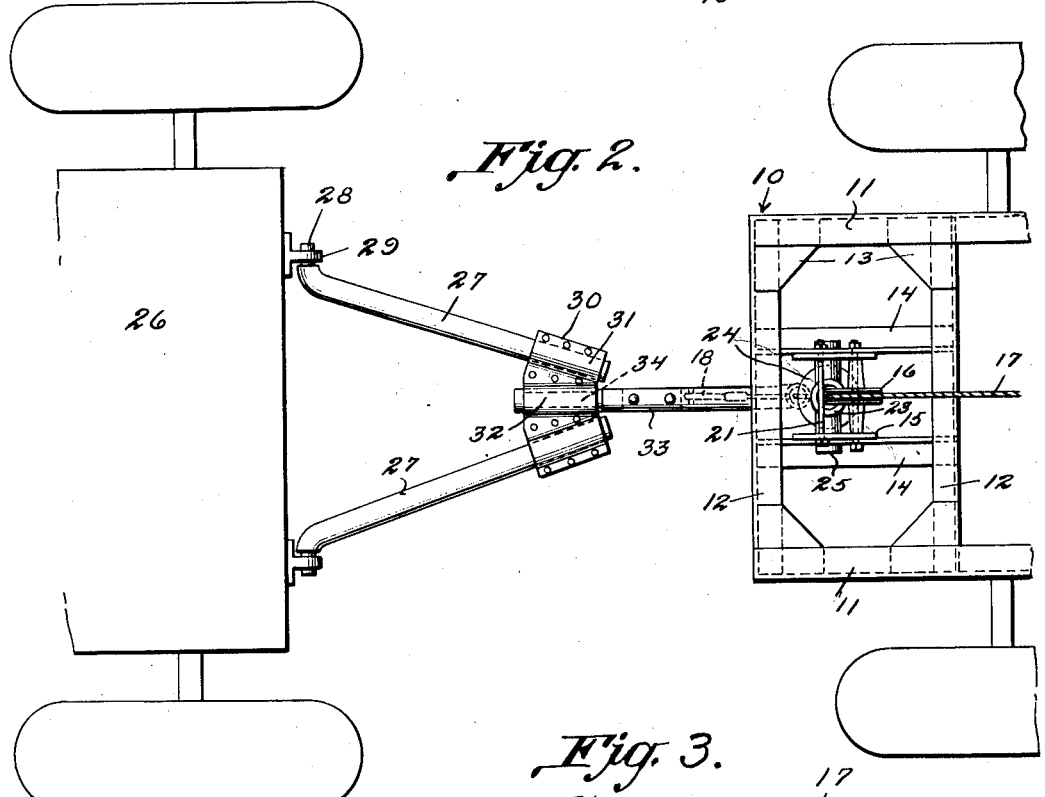
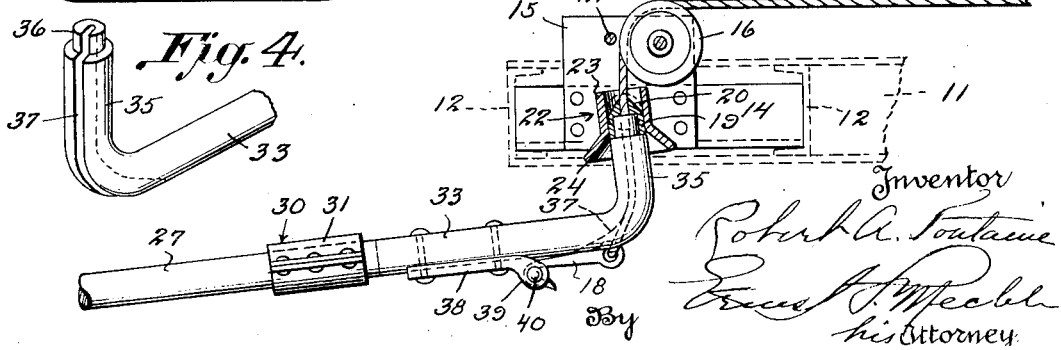

Patented Aug. 29, 1933

1,924,235

UNITED STATES PATENT OFFICE 1,924,235

TRUCK AND TRAILER COUPLING MECHANISM

Robert A. Fontaine, Martinsville, Va.

Application July 28, 1930. Serial No. 471,255

10 Claims. (Cl. 280—33.44)

The invention relates to means for connecting a towing vehicle with a trailer and has for its general object the provision of a novel mechanism for positively connecting the draft tongue of a trailer at the proper location on the truck or other towing vehicle regardless of whether the trailer wheels be "cut" or not with respect to the wheels of the towing vehicle, that is to say regardless of whether the trailer tongue be in alinement or out of alinement with the longitudinal axis of the towing vehicle.

A more specific object of the invention is to provide a connecting or coupling means of this character which may be operated by a windlass or winding drum applied to the towing vehicle or already forming a part thereof, this latter detail being immaterial.

Another important object of the invention is to provide a coupling device of this character embodying means on the towing vehicle and other means on the trailer which will positively draw the trailer into proper alinement with the towing vehicle and also movement forwardly or rearwardly as occasion may require to bring about coupling.

Another object of the invention is to provide a coupling means of the character mentioned which is entirely power operated and which does not require any personal manipulation other than to engage a hook with an element of a keeper-like nature on the trailer, it being consequently obviously safe to effect coupling as the operator or attendant need not remain near the mechanism.

A further object of the invention is to provide an apparatus of this character by means of which disengagement of the towing and towed vehicle may be effected just as simply as engagement, there being a material saving in time as well as in labor.

An additional object is to provide a mechanism of this character which will be simple and inexpensive to make, assemble and install, easy to operate, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a side elevation of a portion of the rear end of a towing truck and the front end of a trailer and illustrating my coupling mechanism ready for coupling, Figure 2 is a top plan view of what is shown in Figure 1, Figure 3 is a fragmentary view partly in elevation and partly in section of the tail end of the towing vehicle showing the forward end of the trailer tongue connected therewith and in towing position, and Figure 4 is a fragmentary perspective view of the forward end of the tongue.

Referring more particularly to the drawing, the numeral 10 designates a portion of the rear end of a truck, tractor or other towing vehicle. The details of construction of this vehicle do not enter into the present invention, at least generally considered, though as a matter of fact I have disclosed this vehicle as comprising a wheel supported frame including side bars 11 connected by transverse bars 12 with suitable braces 13 at the intersections. I have also shown spaced parallel longitudinally extending bars 14 secured in any preferred manner at their ends to the bars 12. Located between and secured to the bars 14, which are preferably of angle form or L-shaped in cross section, are spaced upstanding plates 15 between which is mounted a grooved guide pulley or roller 16 over which is trained a cable 17 equipped at one end with a hook 18 for a purpose to be described and having its other end secured to and wound about a windlass or winding drum, not shown, mounted on the truck or other towing vehicle at any desired location. The reason why the windlass is not shown is because it is a common sort of device and may be of any preferred specific construction. Between the hook 18 and the roller the cable carries a sleeve 19 slidable therealong, this sleeve having a tapered or conical end 20 for a purpose to be described.

Located between the plates 15 which, incidentally, are held against spreading by a transverse bolt 21 is a holder or retainer indicated generally by the numeral 22. This member comprises a cylindrical body 23 having an inverted frusto-conical or flaring guide flange 24 at its lower end and provided with diametrically oppositely extending trunnions 25 journaled in the spaced plates 15 so that it is capable of rocking movement about a horizontal axis.

The specific construction of the trailer, indicated generally by the numeral 26, forms no part of the present invention except in so far as the tongue is concerned. As a matter of fact this trailer may very conveniently be as disclosed in my co-pending application for patent for Brick stack carrying trailer filed of even date herewith, Serial No. 471,256. The tongue structure is here represented as comprising a V-shaped member including a pair of forwardly converging rods 27 having laterally extending trunnions 28 at their rear ends rotatably engaged through brackets 29 on the front of the trailer. The forward ends of the rods 27 are connected by a sectional or two-part clamp 30 which may be formed by casting or stamping, this being immaterial, the clamp having portions 31 embracingly engaging the rods 27 and having semicylindrical bearing portions 32 located therebetween. The tongue also includes an arm or rod 33 having a reduced portion 34 rotatably engaged within the bearing portions 32 so as to be incapable of longitudinal movement while capable of rotary movement with respect to the remainder of the tongue. This member 33 is of L-shape, its longer leg lying in the same plane as that occupied by the rods 27 and its shorter leg or forward end 35 being extended upwardly and terminating in a trunnion or reduced extension 36. The bight of the curve at the juncture of the long and short legs of this member 33 is formed with a slot 37 adapted to receive the cable 17 above referred to in a manner to be described, this slot extending likewise through the reduced extension 36.

For cooperation with the hook 18, the tongue is equipped with a keeper or catch device which in the present instance is disclosed as a member 38 secured to the underside of the arm or rod 33 and having spaced apertured ears 39 through which extends a bolt or rivet 40.

In the operation of the device, it should be understood at the outset that the V-shaped portion of the tongue comprising the rods 27 connected by the sectional clamp can swing vertically owing to the engagement of the trunnions 28 within the brackets 29. It should also be understood that the rod or arm 33 is rotatable axially within the bearing portions 32 of the clamp 30. The reason for this is to permit up and down movement of the trailer with respect to the towing vehicle, and also to permit canting, lateral rocking or twisting of the trailer with respect to the truck or other towing vehicle while the member 33 is held rigid. Assuming that the trailer is behind the towing vehicle at approximately the correct position and that it is desired to effect connection or coupling of the two, it is merely necessary to slack off on the cable 17 so that the hook 18 may be inserted between the ears 39 and engaged over the transverse element 40. It is then preferable though sometimes not necessary that the operator guide the cable into the slot 37 simply as a preliminary step. If the operator does this, as he really should, it is a very simple matter to pull the cable into the slot and then slide down the guide 19 until its recessed lower end fits upon the reduced extension 36 at the forward end of the member 33. It is intended that the member 19 fit sufficiently snugly that the engagement of the cable within the slot 37 will be maintained without any further personal attention on the part of the operator. The power or hand mechanism for the winding drum or windlass, not shown, is then operated to apply tension to the cable 17 or wind it in. As this is done it is obvious that the trailer tongue will be lifted from the ground. Furthermore as the winding in tension is applied to the cable 17 it is clear that as this cable runs over the guide pulley 16 and through the retaining member 22 the forward end of the tongue will be conducted into the member 22, being guided into the cylindrical portion 23 thereof by the outstanding flaring portion 24. It is then intended that whatever brake mechanism is provided for the windlass be set so that the cable 17 will not slack off accidentally. In view of the fact that the guide element 19 fitting upon the reduced extension 36 then fits within the cylindrical sleeve 23 and in view of the fact that the member 22 is confined between the plates 15 it is obvious that when the towing vehicle is driven the tractive force will be communicated to the trailer through the tongue. Any racking of the trailer with respect to the truck will cause no derangement of the parts owing to the revolubility of the reduced portion 34 of the member 33 within the bearing portions 32 of the clamp 30. In view of the fact that the member 22 is pivoted between the plates 15 by means of the trunnions 25 it is readily apparent that the member 22 may shift its position to accommodate the pull on the trailer so that there will be no unnecessary or destructive strain on any of the parts. To effect disconnection or uncoupling it is merely necessary to slack off on the cable 17 so that the member 19 may slip out of the member 22 and slip off from the reduced extension 36, the tongue falling to the ground, subsequently to which the hook 18 is disengaged from the keeper 40.

From the foregoing description and a study of the drawing it will be apparent that I have thus provided a very simply constructed and easily operated means for coupling together a towing vehicle and a trailer. After the initial steps are performed there is no necessity for the operator to be near the coupling device and there is consequently no danger to him. Furthermore in view of the fact that the cable can be engaged and fastened within the slot 37 in the trailer tongue it is not necessary that the tongue be in perfect alinement with the longitudinal center line of the towing vehicle, or in other words the trailer wheels may be "cut" with respect to those of the towing vehicle. It is really believed that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. Means for coupling a towing vehicle and a trailer, comprising a tongue including a rear portion pivoted on the trailer for movement about a horizontal axis and including a forward portion connected to the rear portion for movement with respect thereto about its longitudinal axis only, retaining means on the towing vehicle, and windlass operated means on the towing vehicle guidably engageable beneath the tongue and connectible therewith at a point spaced from its end for engaging the tongue with the retaining means.

2. Means for coupling a towing vehicle to a trailer, comprising a tongue pivoted to the trailer for movement about a horizontal axis, retaining means on the towing vehicle, a windlass operated cable on the towing vehicle, and a hook on the end of the cable engageable with an eye on the tongue, the cable operating to guide the tongue into said retaining means upon the application of tension to the cable, the tongue having means receiving and enclosing the cable.

3. Means for coupling together a towing vehicle and a trailer, comprising retaining means on the towing vehicle, a tongue on the trailer pivoted thereto for movement about a horizontal axis and including a forward portion revoluble with respect thereto about its longitudinal axis only, and flexible means on the towing vehicle connectible with the tongue at the underside thereof in spaced relation to its end for drawing the tongue into said retaining means, and means on the tongue projecting downwardly beyond said flexible means.

4. Means for coupling a trailer to a towing vehicle, comprising a tongue pivoted to the trailer for movement about a horizontal axis and having an upwardly curved front end, a retaining member mounted on the towing vehicle, and a windlass operated cable on the towing vehicle passing through said retaining member and carrying a hook connectible with the tongue at the underside thereof, the underside of said curved front end of the tongue having a slot receiving the cable to prevent contact thereof with the ground.

5. Means for coupling a trailer to a towing vehicle, comprising a tongue pivoted to the trailer for movement about a horizontal axis, a retaining member mounted on the towing vehicle, and a windlass operated cable on the towing vehicle passing through said retaining member and connectible with the tongue, said tongue having an upwardly directed forward end provided with a slot receiving the cable to prevent the cable from being abraded by contact with the ground when the tongue is resting thereupon.

6. Means for coupling a trailer to a towing vehicle, comprising a tongue pivoted to the trailer for movement about a horizontal axis, a retaining member mounted on the towing vehicle, a windlass operated cable on the towing vehicle passing through said retaining member and connectible with the tongue, said tongue having an upwardly directed forward end provided with a slot receiving the cable, and a guide element slidable on the cable and engageable with the forward end of the tongue to retain the cable in said slot.

7. Means for coupling a trailer to a towing vehicle, comprising a tongue pivoted to the trailer for movement about a horizontal axis, a retaining member mounted on the towing vehicle, a windlass operated cable on the towing vehicle passing through said retaining member and connectible with the tongue, said tongue having an upwardly directed forward end provided with a slot receiving the cable, and a guide element slidable on the cable and engageable with the forward end of the tongue to retain the cable in said slot, the extremity of the tongue having a reduced extension and said guide element being socketed to fit thereover.

8. Means for coupling a trailer to a towing vehicle, comprising a tongue pivoted to the trailer for movement about a horizontal axis, a retaining member mounted on the towing vehicle, a windlass operated cable on the towing vehicle passing through said retaining member and connectible with the tongue, said tongue having an upwardly directed forward end provided with a slot receiving the cable, and a guide element slidable on the cable and engageable with the forward end of the tongue to retain the cable in said slot, the extremity of the tongue having a reduced extension and said guide element being socketed to fit thereover, said retaining member having a flaring guide flange at its lower end and having its major portion of cylindrical form to receive said guide member.

9. Means for coupling together a towing vehicle and a trailer, comprising a tongue pivoted on the trailer for swinging movement about a horizontal axis, a retaining member of sleeve-like form with a substantially vertical axis mounted on the towing vehicle for movement about a horizontal axis, a windlass operated cable on the towing vehicle extending through said retaining member and connectible with the tongue, and means on the cable engageable with the tongue and receivable within the retaining member.

10. Means for coupling together a towing vehicle and a trailer, comprising a tongue pivoted on the trailer for swinging movement about a horizontal axis, a retaining member of sleeve-like form with a substantially vertical axis mounted on the towing vehicle for movement about a horizontal axis, a windlass operated cable on the towing vehicle extending through said retaining member and connectible with the tongue, and means on the cable engageable with the tongue and receivable within the retaining member, said tongue including a forward portion revoluble about an axis extending longitudinally with respect to the trailer.

ROBERT A. FONTAINE.